Patented Nov. 27, 1923.

1,475,422

UNITED STATES PATENT OFFICE.

GEORGES BONNARD, OF PLOMBIERES ST. MARCEL, FRANCE.

PROCESS FOR REFINING TIN AND ANTIMONY.

No Drawing.   Application filed March 15, 1920.   Serial No. 366,008.

*To all whom it may concern:*

Be it known that I, GEORGES BONNARD, a citizen of the French Republic, residing at Plombieres St. Marcel, Savoie, in the Republic of France, have invented certain new and useful Improvement in Processes for Refining Tin and Antimony, of which the following is a specification.

Tin is commonly found in commerce the market value of which is considerably reduced owing to the presence of certain foreign metals, particularly copper, lead, antimony, titanium, silver and zinc at the same time as arsenic and sulphur. One or more of these elements are also found in the residual tins or the alloys of which tin is the basis employed in mechanical construction. All the processes now employed for refining these crude or residual tins have recourse to metallurgy by the fire method, which causes a comparatively considerable expenditure of energy and coal, also loss of tin by volatilization which very quickly reaches a high percentage. Finally all these processes must logically vary in accordance with the composition of the crude tins to be refined.

The process which forms the subject matter of the present invention permits on the contrary of obtaining in an economical manner pure tin and antimony, whatever the elements may be which they are associated with.

The process consists in attacking the crude tin with dry chlorine obtained for example, by vaporizing liquid chlorine. Under these conditions, among the elements enumerated, copper, lead, silver and titanium remain unattacked; on the contrary tin, antimony, arsenic, zinc and sulphur are transformed into anhydrous chlorides. Although however, the tetrachloride of tin, the pentachloride of antimony, the chloride of arsenic and the chloride of sulphur are liquid at ordinary temperature the chloride of zinc on the contrary is solid. By decanting or filtering off all the products resulting from the attack on the crude tin by the chlorine the copper, titanium, lead, silver and chloride of zinc are therefore collected in the form of a mud, the filtered liquid containing nothing more than the tetrachloride of tin, the pentachloride of antimony, the chloride of arsenic and the chloride of sulphur.

By treating the mixture of these four chlorides with water and cooling it to prevent any excessive rise of temperature a solution of stannic chloride is obtained while the pentachloride of antimony, the chloride of arsenic and the chloride of sulphur are decomposed with the formation of hydrochloric acid simultaneously with sulphur and other solid products more or less oxidized but insoluble.

A fresh decantation or filtration therefore yields a pure aqueous solution of stannic choride from which the tin is obtained electrolytically. It seems also that it is advantageous before proceeding with the electrolysis, to transform this solution of a stannic chloride into stannous chloride by a suitable reducing agent.

A deposit of perfectly pure tin is thus obtained at the cathode while the chlorine evolved at the anode is dried so as to serve for the treatment of a fresh quantity of crude tin.

Theoretically the consumption of chlorine is therefore zero.

In order to separate the antimony a modification of the process may be employed which is as follows:

The mixture containing the tetrachloride of tin issuing from the reaction apparatus in which the attack on the crude tin by the chlorine is carried out, is heated up to about from 115°–120°, this step being effected prior to the first filtration hereinbefore referred to. At this temperature the pentachloride of antimony is decomposed into chlorine which escapes and trichloride of antimony which is solid and can consequently be collected when the first filtration is carried out.

The same process allows of the separation of the antimony from the lead or any of the elements enumerated.

The impurities which are separated in the form of a mud are treated by any suitable process in order to separate the constituents thereof.

The economy of this process permits of the simplification of the metallurgy of tin and antimony. There is no longer any inconvenience in leaving in the crude metal a more or less considerable quantity of impurities, these being perfectly eliminated by the process forming the subject matter of the present invention without the application thereof being more costly when the quantity of impurities contained increases.

It goes without saying that this process may likewise be applied to the metallurgy of tin and antimony, this latter being separated in the form of the liquid, pentachloride if tin does not figure among the impurities.

What I claim and desire to secure by Letters Patent of the United States is:—

1. The herein described process of refining tin and antimony which comprises subjecting crude tin to the action of dry chlorine, separating the liquid chlorides thus obtained from the solid and semi-solid materials, adding water to said liquid mixtures to produce a solution of stannic chloride and decompose the chlorides of antimony, arsenic and sulphur, separating out the solution of stannic chloride, and electrolytically obtaining tin from such solution.

2. The herein described process of refining tin and antimony which comprises subjecting crude tin to the action of dry chlorine, separating the liquid chlorides thus obtained from the solid and semi-solid materials, adding water to said liquid mixture to produce a solution of stannic chloride and decompose the chlorides of antimony, arsenic and sulphur, separating out the solution of stannic chloride, transforming such solution into stannous chloride, and electrolytically obtaining tin from such solution.

3. The herein described process of refining tin and antimony which comprises subjecting crude tin to the action of dry chlorine, separating the liquid chlorides thus obtained from the solid and semi-solid materials, treating such mixture of chlorides to separate the tetrachloride of tin therefrom, decomposing the tetrachloride of tin by treatment with water to produce stannic chloride in aqueous solution and electrolytically obtaining tin from such solution.

4. The herein described process of refining tin and antimony which comprises subjecting crude tin to the action of dry chlorine, separating the liquid chlorides thus obtained from the solid and semi-solid material, treating such mixture of chlorides to separate the tetrachloride of tin therefrom, decomposing the tetrachloride of tin by treatment with water to produce stannic chloride in aqueous solution, transforming such solution into stannous chloride and electrolytically obtaining tin from such solution.

5. The process which comprises treating crude tin with dry chlorine, separating the resulting liquid from the resulting solids, adding water to the liquids and separating the resulting liquid and solids, thus obtaining a pure solution of tin.

In testimony whereof I affix my signature in presence of two witnesses.

GEORGES BONNARD.

Witnesses:
 ANDRÉ HULER,
 A. MACFARLANE.